Dec. 29, 1953   J. P. HOBART   2,664,305
SHIFT ROD ADJUSTING CLAMP
Filed April 7, 1949

Inventor
John P. Hobart
By
Spencer, Willits, Helmig & Baillio
Attorneys

Patented Dec. 29, 1953

2,664,305

UNITED STATES PATENT OFFICE 2,664,305

SHIFT ROD ADJUSTING CLAMP

John P. Hobart, Birmingham, Mich., assignor to General Motors Corporation, Detroit, Mich., a corporation of Delaware Application April 7, 1949, Serial No. 86,089

2 Claims. (Cl. 287—54)

This invention relates to a rod clamp, and more particularly to a clamp for pivotally connecting two rods in a transmission remote control linkage.

The object of this invention is to provide an adjustable pivoted connection between two rods wherein the clamping element is pivoted to one rod and securely clamped but readily adjustable with respect to the other rod.

Another object of the invention is to provide in a clamp a powdered metal clamping block having formed portions engaging a rod in an adjustable connection for pivotally connecting a lever and a control rod.

The adjustable pivotal connecting clamp consists of a block portion apertured to slidably receive one rod, and having one stud attached to the block for pivotally securing the block to another lever or rod, and another stud perpendicular to the axis of the first rod to hold a powdered metal clamping element having formed portions in contact with said first rod.

Other objects and advantages of the invention will be apparent from the following drawings and detailed description.

Figure 1:
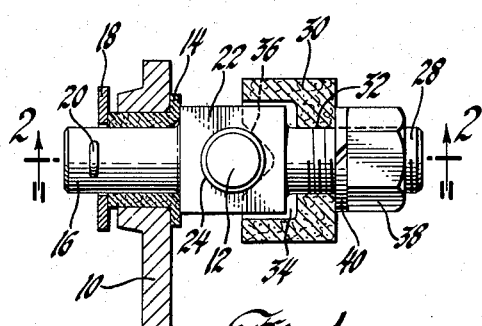
Figure 1 is an elevation in partial section of the clamp pivotally connecting the two rods.
Figure 2:
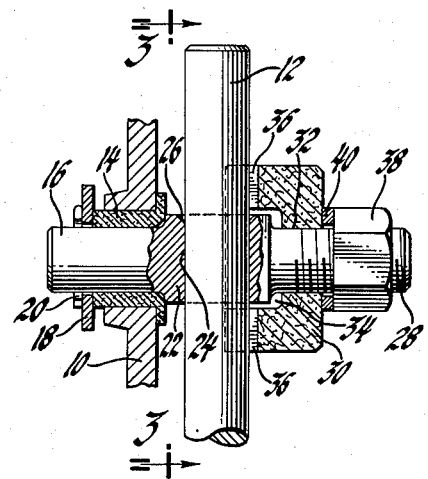
Figure 2 is a partial section on the line 2—2 of Figure 1.
Figure 3:
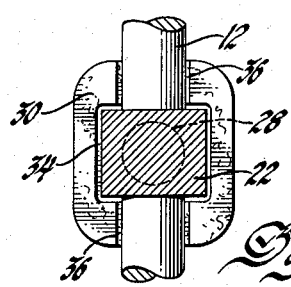
Figure 3 is a section of Figure 2 on the line 3—3.
Figure 4:
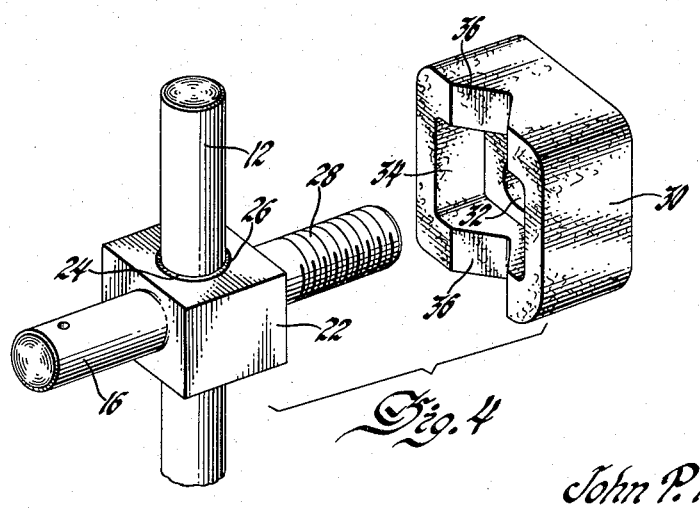
Figure 4 is a perspective view showing the clamp with the clamping cap removed.

The clamp, in accordance with this invention, provides a pivotal connection between a pivoted lever or rod 10, such as the lever in a gearshift control linkage normally pivoted at the base of the steering column and the rod 12 which normally connects the lever 10 to the transmission. The lever 10 has an aperture adjacent the free end with a bearing insert 14 fixed therein. The bearing insert has a shoulder engaging the face of the lever 10 adjacent the clamp to hold the bearing in the lever and to provide a bearing for the clamp block. This bearing may be made of suitable material such as powdered metal impregnated with oil or rubber to allow for alignment variations. The pivot stud 16 of the clamp is rotatably positioned in this bearing and secured therein by suitable means, such as the washer 18 and cotter pin 20.

The pivotal stud 16 is secured to the main body portion or block 22 of the clamp. The block is larger than the stud and bears against a shoulder or flange portion on the bearing 14, which prevents binding and wear between the block and lever. The block portion 22 has a centrally located aperture 24 to slidably receive the control rod 12. The end face or faces of the block 22 surrounding the aperture 24 may be bevelled as at 26 to facilitate rapid insertion of the rod in the clamp block.

In order to clamp the rod 12 in the aperture 24 a stud 28 is secured to the block 22 at right angles to the axis of the rod 12 and preferably in alignment with pivotal stud 16. A cap-shaped clamping element 30, which has a central aperture 32 fitting over the stud 28 and a central cavity 34 fitting over the block 22, is employed to clamp the rod. Two opposed sides of the clamping cap 30 have V-shaped recesses 36 which engage the rod 12 at each side of the block 22. The cap 30 or clamping block is made of a hard and rigid metal so that it will bite into and clamp the rod 12 without deforming. The hard, rough and porous sintered powdered iron materials have been found especially suitable for this clamping cap. The sintered powdered iron is sufficiently hard and porous or rough to produce a non-slip metallic clamping block.

As shown in Figure 1 it is noted that there is clearance between the base in the cavity 34 in the clamping cap and the block when the V-shaped recesses 36 engage the rod 12. Suitable means, such as the threaded nut 38 and lock washer 40 are provided on the stud 28 in order to force the clamp 30 toward the block and engage the rod 12.

The clamping device is assembled by securing the stud 16 to the lever 10 by means of the cotter pin, and then the rod 12 is inserted in the aperture 24. The clamping cap 30 is left loose until all the elements of the linkage are assembled and secured. Then after final adjustment of the linkage has been made, the nut 38 is tightened to force the clamping cap 30 against the rod 12 to provide a secure pivotal connection between the lever 10 and the rod.

The above description of a specific embodiment of the invention will suggest various modifications of the invention within the scope of the invention as defined in the appended claims.

I claim:

1. In a rod clamp, a rectangular block having an aperture therein extending through said block between the central portion of two opposed side faces to receive a first rod, aligned studs transversely located with respect to said aperture and secured to two opposed end faces of said block transversely located with respect to said two opposed side faces, means to pivotally secure one of said studs to a second rod, a clamping element having a base portion and a narrow surrounding side wall portion providing a central cavity, said base portion of the clamping element having an aperture, said side wall portion of said clamping element having cooperating inside faces engaging the side faces of said block to prevent relative rotation and a V-shaped recess in the edge of two opposed narrow side wall portions of said surrounding side wall portion having the inside faces engaging the apertured opposed faces of said block, said clamping element being positioned on said block with the other of said studs passing through said last named aperture and said inside faces engaging the side faces of said block with the V-shaped recesses engaging the first rod in said first named aperture and means on said other stud engaging said clamping element to force the clamping element into engagement with the first rod.

2. In a rod clamp, a block having an aperture therein extending through the block between two opposed side surfaces to receive a first rod, aligned studs transversely located with respect to said aperture and secured to two opposed end surfaces of said block transversely located with respect to said two opposed side surfaces, means to pivotally secure one of said studs to a second rod, a clamping element having a base portion and a narrow surrounding side wall portion providing a central cavity, said base portion of the clamping element having an aperture, said side wall portion of said clamping element having a cooperating inside surface engaging a side surface of said block to prevent relative rotation and a V-shaped recess in the edge of two opposed narrow side wall parts of said surrounding side wall portion having the inside surfaces adjacent the apertured opposed surfaces of said block, said clamping element being positioned on said block with the other of said studs passing through said last named aperture and said inside faces adjacent the side faces of said block with the V-shaped recesses engaging the first rod in said first named aperture and means on said other stud engaging said clamping element to force the clamping element into engagement with the first rod.

JOHN P. HOBART.

References Cited in the file of this patent

UNITED STATES PATENTS

| Number | Name | Date |
|---|---|---|
| 564,228 | Sparling | July 21, 1896 |
| 797,376 | Schneider, Sr. | Aug. 15, 1905 |
| 930,162 | Dulinsky | Aug. 3, 1909 |
| 1,435,092 | Thomas | Nov. 7, 1922 |
| 1,482,148 | Ratigan | Jan. 29, 1924 |
| 2,447,434 | Schwarzkopf | Aug. 17, 1948 |
| 2,456,505 | Hastings | Dec. 14, 1948 |
| 2,482,901 | Cianfrone | Sept. 27, 1949 |
| 2,549,939 | Shaw et al. | Apr. 24, 1951 |

FOREIGN PATENTS

| Number | Country | Date |
|---|---|---|
| 18,557 | Great Britain | Sept. 17, 1901 |
| 60,130 | Denmark | Aug. 24, 1942 |

OTHER REFERENCES

Publication: Treatise on Powder Metallurgy, vol. II, copy in Div. 3.